United States Patent [19]

Qureshi et al.

[11] Patent Number: 4,593,056
[45] Date of Patent: Jun. 3, 1986

[54] EPOXY/AROMATIC AMINE RESIN SYSTEMS CONTAINING AROMATIC TRIHYDROXY COMPOUNDS AS CURE ACCELERATORS

[75] Inventors: Shahid P. Qureshi, Piscataway; Hugh C. Gardner, Somerville, both of N.J.

[73] Assignee: Union Carbide Corporation, Danbury, Conn.

[21] Appl. No.: 747,189

[22] Filed: Jun. 21, 1985

[51] Int. Cl.$^4$ .................. C08G 59/68; C08G 59/50
[52] U.S. Cl. .................. 523/445; 523/435; 523/457; 523/459; 523/466; 523/468; 525/113; 525/396; 525/407; 525/415; 525/423; 525/504; 525/524; 528/88; 528/90; 528/93; 528/104; 528/124; 528/361; 528/407
[58] Field of Search ............ 528/88, 90, 93, 104, 528/124, 361, 407; 525/504, 113, 396, 407, 415, 423, 524; 523/435, 445, 466, 468, 457, 459

[56] References Cited

U.S. PATENT DOCUMENTS 3,779,950  12/1973  Kohn et al. ............ 528/104 X
3,853,812  12/1974  Helm .................... 528/124 X
4,246,162   1/1981  Schreiber ............... 528/104 X

FOREIGN PATENT DOCUMENTS 2924717  1/1980  Fed. Rep. of Germany .
 192428 11/1982  Japan .
1054045  1/1967  United Kingdom .

OTHER PUBLICATIONS

Markovitz, American Chemical Society Symposium 1976, S. S. Labana, Editor, pp. 49 to 58.
McLean et al, Report No. 14450 of the National Research Council of Canada, Nov. 1974.
Gough et al, Journal of Oil and Color Chemists Association, vol. 43, pp. 409 to 418, 1960.
Nagy, Adhesives Age, pp. 20 to 27, Apr., 1967.
Partensky, American Chemical Society Advances in Chemistry Series, vol. 92, pp. 29 to 47, 1970.
C. A. May and Y. Tanaka, Epoxy Resins Chemistry and Technology, Marcel Dekker, New York, 1973., pp. 293-294 and 341-346.
Schechter et al, Industrial and Engineering Chemistry, vol. 48, No. 1, pp. 94 to 97, 1956.
Bowen et al, American Chemical Society Advances in Chemistry Series, vol. 92, pp. 48 to 59, 1970.

*Primary Examiner*—Earl Nielsen
*Attorney, Agent, or Firm*—M. N. Reinisch

[57] ABSTRACT

Curable thermosetting resin compositions comprising an epoxy resin having at least two 1,2-epoxy groups per molecule, an aromatic diamine hardener, and as a cure accelerator an aromatic trihydroxy compound are disclosed. The aromatic trihydroxy compound, such as for example, phloroglucinol, n-propyl gallate, or pyrogallol, improves the cure speed of the epoxy/aromatic diamine resin system, while at the same time producing cured compositions having excellent mechanical and thermal properties. The disclosed compositions find particular application in the preparation of composites by, e.g., filament winding procedures.

27 Claims, No Drawings

EPOXY/AROMATIC AMINE RESIN SYSTEMS CONTAINING AROMATIC TRIHYDROXY COMPOUNDS AS CURE ACCELERATORS

BACKGROUND OF THE INVENTION

The present invention relates to curable epoxy/aromatic diamine resin systems containing a defined group of aromatic trihydroxy compounds as cure accelerators.

The three dimensional epoxy-amine network produced by the curing of amine/epoxy resin formulations is well known to exhibit desirable mechanical and thermal properties. As a result, amine curable epoxy resin systems have been widely used as coatings, adhesives, sealants and matrices for fiber-reinforced composites. For each application, the epoxy/amine resin formulation must possess a particular degree of reactivity. In many cases, the reaction rate must be increased, and cure accelerators are added. Typically, additives which increase the cure rate seriously degrade the mechanical and thermal properties of the cured resin. Thus, there is a need to increase the cure speed of the epoxy/amine formulations while maintaining or preferably increasing the high mechanical properties (such as tensile strength and modulus) which are obtained with the unaccelerated resin system. This improvement is particularly desirable in high performance applications such as composites.

Considerable efforts have accordingly been made to improve epoxy/amine resin systems by adding various additives thereto. C. A. May and Y. Tanaka, *Epoxy Resins Chemistry and Technology*, Marcel Dekker, New York, 1973, for example, describes the addition of various Lewis acids, Lewis bases, and numerous salts and complexes as accelerators for epoxy/amine systems. Such accelerators, while improving the cure speed, have been found to adversely effect mechanical properties due to homopolymerization of the epoxy groups, which is facilitated in the presence of such accelerators.

It has also been disclosed that various mono- and di-hydroxy substituted aromatic compounds are effective in increasing the cure speed of certain epoxy resins. For example, Schechter et al in *Industrial and Engineering Chemistry*, Volume 48, No. 1, pages 94 to 97, 1956, disclosed that phenol was more effective than aliphatic alcohols in accelerating the reaction of phenyl glycidyl ether with diethylamine. Bowen et al in the *American Chemical Society Advances in Chemistry Series*, Volume 92, pages 48 to 59, 1970, disclosed that 4,4'-dihydroxydiphenyl sulfone, phenol, tetrabromobisphenol A and bisphenol A decreased the gel time of bisphenol A epoxy/triethylenetetramine systems with similar degrees of effectiveness.

Resorcinol, phenol, and various halogenated and nitrated derivatives of these compounds have also been found by Gough et al (*Journal of Oil and Color Chemists Association*, Volume 43, pages 409 to 418, 1960), Nagy (*Adhesives Age*, pages 20 to 27, April, 1967) and Partensky (*American Chemical Society Advances in Chemistry Series*, Volume 92, pages 29 to 47, 1970) to accelerate the cure of glycidyl epoxy/amine mixtures. In addition, Markovitz in "Chemical Properties of Crosslinked Polymers", *American Chemical Society Symposium* 1976, S. S. Labana, Ed., pages 49 to 58, has described the use of resorcinol and metal salts as coaccelerators for curable compositions containing cycloaliphatic epoxides.

While resorcinol and phenol thus have been found to provide desirable improvements in cure speed to certain epoxy/amine resin systems, further improvements in the cure speed of such systems, particularly with respect to cycloaliphatic epoxide/amine resin formulations, would be desirable.

In many epoxy/amine formulations, cycloaliphatic epoxides are used as the epoxy component since they impart improved mechanical and thermal properties to the cured compositions. For example, unreinforced castings of bis(2,3-epoxycyclopentyl)ether cured with m-phenylenediamine have tensile strengths and tensile moduli which are among the highest of any thermosetting material. Similarly, as described by McLean et al in Report No. 14450 of the National Research Council of Canada, November, 1974, high mechanical properties can be achieved in unreinforced castings made by curing 3,4-epoxycyclohexylmethyl 3,4-epoxycyclohexane carboxylate with methylene dianiline. However, resin systems containing bis(2,3-epoxycyclopentyl)ether or 3,4-epoxycyclohexylmethyl 3,4-epoxycyclohexane carboxylate cure more slowly with aromatic amines than similar compositions containing bisphenol A epoxy resins. This characteristic limits their utility in composite fabrication processes such as filament winding and reaction injection molding. Thus, there is a need for improved cure accelerators for cycloaliphatic epoxide/amine resin systems.

From Japanese Kokai No. 82/192428, published November 26, 1982, adhesive compositions comprising 3,4-epoxycyclohexylmethyl 3,4-epoxycyclohexane carboxylate, triethanolamine borate and pyrogallol, in a weight ratio of 100:1:3, are known. Triethanolamine borate promotes the homopolymerization of the epoxy groups present in this formulation. Upon curing, the compositions of this publication primarily possess a crosslinked epoxy homopolymer structure, which possesses inferior mechanical properties as compared with thermosetting systems characterized by an epoxy-amine network structure, i.e., the epoxy/aromatic diamine formulations. As a result, the compositions of this reference have limited applications, and are not useful in high performance applications such as in composites.

German Offenlegungsschrift DE No. 2924717, published Jan. 10, 1980, describes the use of approximately stoichiometric amounts of pyrogallol to harden 1,3-diglycidyl-5,5-dimethylhydantoin. This system does not contain an aromatic amine curing agent. Moreover, in this system the pyrogallol does not function as a cure accelerator, but crosslinks with the epoxy resin. Thus, pyrogallol functions in this system as a curing agent producing a cured composition having an ether network structure.

British Pat. No. 1,054,045 describes the use of pyrogallol to harden bisphenol A type epoxies. In the compositions of this reference, an approximately stoichiometric amount of pyrogallol, with a small amount of methylene dianiline (1.5 parts per 100 parts of resin) as a co-curing agent is employed to crosslink a bisphenol A type epoxy having an epoxide equivalent weight of 500. Due to the large amount of pyrogallol present in this system, the pyrogallol functions as the primary crosslinking agent, leading to a cured composition having primarily an ether network structure.

While the prior art has thus described various mono- and dihydroxy aromatic compounds as cure accelerators for epoxy/amine resin systems, and has described the use of pyrogallol as a crosslinking agent (hardener)

for epoxy resins, the prior art is devoid of any description of the use of aromatic trihydroxy compounds as cure accelerators for epoxy/aromatic diamine resin systems.

As is well known by those skilled in the art, cure accelerators function in a truly catalytic manner, enhancing the rate of reaction between the epoxy resin and the amine curing agent, without themselves appreciably reacting with the epoxy resin, as shown, e.g., by solvent extraction studies. This result is to be contrasted with the use of these compounds as curing agents wherein the trihydroxy aromatic compound is chemically incorporated into the resin network structure. The use of the trihydroxy aromatic compounds as hardeners (i.e., curing agents or crosslinkers) requires stoichiometric amounts (i.e., from approximately 0.4 to 1.0 equivalents of hydroxy per equivalent of epoxy groups in the epoxy resin), whereas cure acceleration is based on the use of only small quantities of the accelerator of from about 0.01 to about 0.35 equivalents of hydroxy per equivalent of epoxy groups in the epoxy resin, together with the conjoint presence of an aromatic diamine hardener in an amount within the general range of from about 0.4 to about 2.0 equivalents of amine N—H per equivalent of 1,2-epoxy groups in the epoxy resin. Cure acceleration is thus a quite different function from hardening, involving different quantities of additive, different modes of action and the presence of a primary hardener in preferably a stoichiometric excess.

SUMMARY OF THE INVENTION

The present invention is directed to curable, thermosetting epoxy compositions comprising:

(a) an epoxy resin containing at least two 1,2-epoxy groups per molecule;

(b) an aromatic diamine hardener in an amount sufficient to provide from about 0.4 to about 2.0 equivalents of amine N—H per equivalent of 1,2-epoxy groups in the epoxy resin; and (c) an aromatic trihydroxy cure accelerator of the formula (I):

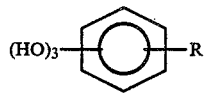

I wherein R is hydrogen, aryl, alkyl,

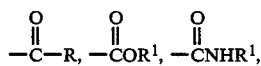

$SO_2R^1$, or $SO_2NHR^1$, and $R^1$ is alkyl or aryl of from 1 to 12 carbon atoms, in an amount sufficient to provide from about 0.01 to about 0.35 equivalents of hydroxy per equivalent of 1,2-epoxy groups in the epoxy resin.

Optionally, the compositions of this invention may also contain a thermoplastic polymer, a structural fiber and/or modifiers to increase the modulus of the cured epoxy resin.

In accordance with the present invention, it has been discovered that the compositions of this invention combine not only improved cure speeds, as compared, for example, with epoxy/aromatic diamine resin systems containing the mono- and dihydroxy aromatic compounds as cure accelerators, but in addition possess excellent mechanical properties. Cured compositions based on bis(2,3-epoxycyclopentyl)ether, a preferred epoxy resin for use herein, an aromatic diamine hardener, and the aromatic trihydroxy cure accelerators of formula (I), for example, have been found to possess tensile strengths of greater than 18,000 psi and tensile moduli of greater than 700,000 psi. This combination of mechanical properties, particularly in combination with the high reactivity and cure speeds characteristic of the compositions of this invention is unique, and makes the instant compositions ideal for use in filament winding applications.

The attainment of both the aforementioned outstanding mechanical properties and high cure speeds of the present compositions is unexpected and contrary to the usual experience with cure accelerators. It is also unexpected that the accelerators of this invention increase cure speed more than the aromatic dihydroxy accelerators, and that the modulus of cured castings containing the trihydroxy accelerators is higher than those of analogous castings containing (a) the aromatic dihydroxy accelerators, or (b) no accelerator. Normally, the use of cure accelerators has been found to have an adverse effect on the mechanical properties of the cured composition. While not wishing to be bound by any specific theory or mode of operation, it is believed that the improvements in mechanical properties resulting from the use of the cure accelerators of this invention results from the fact that the accelerators of formula (I) exert an antiplasticizing effect on the resin. In any event, it has been found that the compositions of this invention generally exhibit improved physical properties, such as tensile modulus and tensile strength, as compared with similar compositions containing, e.g., bisphenol S as cure accelerator.

In addition to the various advantages noted above, the instant compositions have good stability i.e., the accelerator and the epoxy resin can be premixed for periods of weeks or months without an appreciable change in properties. This characteristic facilitates handling in a production embodiment.

As a result of the foregoing advantages, the compositions of the present invention find particular use in the preparation of composites by, e.g., filament-winding and reaction injection molding. In another embodiment, the present invention thus provides composites which comprise the compositions defined above containing structural fibers having a tensile strength of greater than about 100,000 psi, a tensile modulus of greater than about two million psi, and a decomposition temperature of greater than about 200° C.

Other embodiments, features and advantages of this invention will become apparent to those skilled in the art upon examination of the following detailed description of the invention.

DETAILED DESCRIPTION OF THE INVENTION

The cure accelerators of formula (I) include 1,3,5-trihydroxybenzene (phloroglucinol); 1,2,3-trihydroxybenzene (pyrogallol); the $C_1$ to $C_{12}$ alkyl derivatives thereof; the aryl derivatives thereof containing up to 12 carbon atoms in the aryl group such as the phenyl, benzyl and tolyl derivatives; hydrates such as phloroglucinol dihydrate; the $C_1$ to $C_{12}$ alkyl esters of gallic acid (3,4,5-trihydroxybenzoic acid), such as methyl gallate, ethyl gallate, n-propyl gallate, butyl gallate, etc.; the aryl esters of gallic acid wherein the aryl group contains up to 12 carbon atoms, such as phenyl gallate, benzyl gallate and tolyl gallate; phenones, such as 2,4,6-trihydroxy acetophenone, 2,3,4-trihydroxy acetophenone and 2,3,4-trihydroxy benzophenone; the various N—C$_1$ to C$_{12}$ alkyl amides of gallic acid; the N-aryl amides of gallic acid wherein the aryl group contains up to 12 carbon atoms, such as the N-phenyl, N-benzyl and N-tolyl amides of gallic acid; the (3,4,5-trihydroxyphenyl)-C$_1$ to C$_{12}$ alkyl sulfones, and the aryl analogs thereof wherein the aryl group contains up to 12 carbon atoms; and the corresponding sulfonamide analogs. Preferred cure accelerators comprise the various positional isomers of trihydroxy benzene, the hydrates thereof and the C$_1$ to C$_{12}$ alkyl esters of gallic acid, of which phloroglucinol, n-propyl gallate and pyrogallol are particularly preferred.

The epoxy resins which may be used herein contain two or more epoxy groups having the following formula:

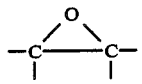

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as bisphenol A, and have structures such as II,

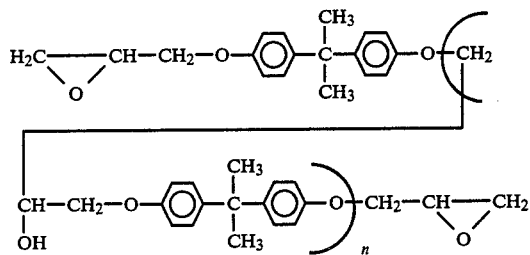

where n has a value from about 0 to about 15. These epoxides are bisphenol-A epoxy resins. They are available commercially under the trade names such as "Epon 828", "Epon 1001", and "Epon 1009", from Shell Chemical Co. and as "DER 331", "DER 332", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl)methane, such as Tactix 742 from Dow Chemical Company, and the like, are useful in this invention. In addition, EPON 1031 (a tetraglycidyl derivative of 1,1,2,2-tetrakis(hydroxyphenyl)ethane (obtained from Shell Chemical Company), and Apogen 101, (a methylolated bisphenol A resin obtained from Schaefer Chemical Co.) may also be used. Halogenated polyglycidyl compounds such as D.E.R. 580 (a brominated bisphenol A epoxy resin obtained from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as III where n=0.1 to 8 and cresol-formaldehyde novolaks such as IV where n=0.1 to 8 are also useable.

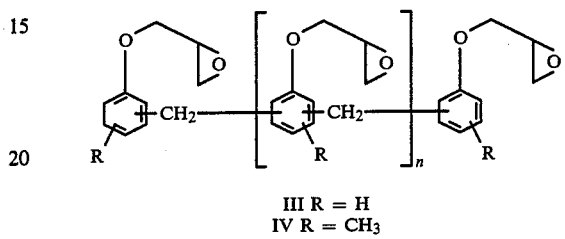

III R = H
IV R = CH$_3$

The former are commercially available as D.E.N 431, D.E.N. 438, and D.E.N. 485 (obtained from Dow Chemical Company). The latter are available as, for example, ECN 1235, ECN 1273, and ECN 1299 (obtained from Ciba Geigy Corporation, Ardsley, NY). Epoxidized novolaks made from bisphenol A and formaldehyde such as SU-8 (obtained from Celanese Polymer Specialties Company, Louisville, KY) are also suitable.

Other polyfunctional active hydrogen compounds besides phenols and alcohols may be used to prepare the polyglycidyl adducts of this invention. These include amines, aminoalcohols and polycarboxylic acids.

Adducts derived from amines include N,N-diglycidyl aniline, N,N-diglycidyl toluidine, N,N,N',N'-tetraglycidylxylylene diamine, N,N,N',N'-tetraglycidyl-bis(-methylamino)-cyclohexane, N,N,N',N'-tetraglycidyl-4,4'-diaminodiphenyl methane, N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, CA.), Araldite MY-720 (obtained from Ciba Geigy Corporation) and PGA-X and PGA-C (obtained from The Sherwin-Williams Co., Chicago, Ill.).

Suitable polyglycidyl adducts derived from amino alcohols include O,N,N-triglycidyl-4-aminophenol, available as Araldite 0500 or Araldite 0510 (obtained from Ciga Geigy Corporation). Also, O,N,N-triglycidyl-3-aminophenol may be used.

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis[3-(2,3-epoxypropoxy)propyl]-2,4,6,8,10-pentamethylcyclopentasiloxane and the diglycidyl ether of 1,3-bis-(3-hydroxypropyl)tetramethyldisiloxane are also useable.

The second group of epoxy resins is that prepared by epoxidation of dienes of polyenes. Resins of this type include bis(2,3-epoxycyclopentyl)ether, V;

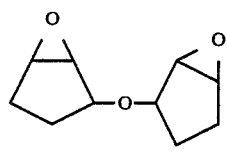

V

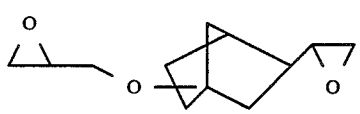

VI copolymers of V with ethylene glycol which are described in U.S. Pat. No. 3,398,102, 5(6)-glycidyl-2-(1,2-epoxyethyl)bicyclo[2.2.1]heptane, VI; and dicyclopentadiene diepoxide. Commercial examples of these types of epoxides include vinylcyclohexene dioxide, e.g., "ERL-4206" (obtained from Union Carbide Corp.), a 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl)adipate, e.g., "ERL-4289" (obtained from Union Carbide Corp.) dipentene dioxide, e.g., "ERL-4269" (obtained from Union Carbide Corp.) 2-(3,4-epoxycyclohexyl-5,5-spiro-3,4-epoxy)cyclohexane meta-dioxane, e.g., "ERL-4234" (obtained from Union Carbide Corp.) and epoxidized polybutadiene, e.g., "Oxiron 2001" (obtained from FMC Corp.).

Other suitable cycloaliphatic epoxides include those described in U.S. Pat. Nos. 2,750,395; 2,890,194; and 3,318,822 which are incorporated herein by reference, and the following:

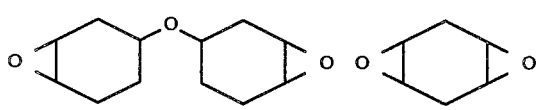

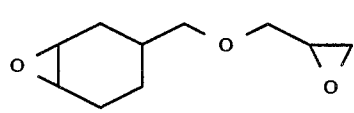

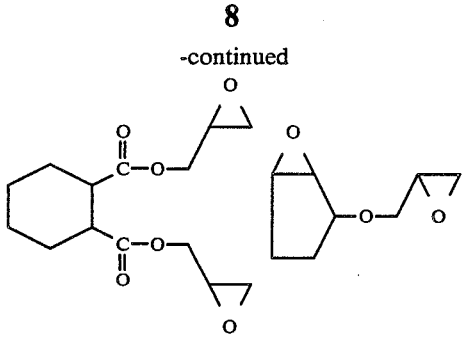

Other suitable epoxides include:

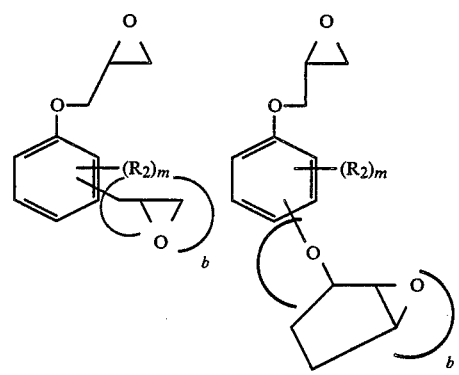

where b is 1 to 4, m is (5-b), and $R_2$ is H, halogen, or $C_1$ to $C_4$ alkyl.

The preferred epoxy resins, particularly for use in composite applications, comprise the aforementioned cycloaliphatic epoxides, especially, bis(2,3-epoxycyclopentyl)ether, vinyl cyclohexene diepoxide, 2-(3,4-epoxycyclohexyl-5,5-spiro-3,4epoxy)cyclohexane meta-dioxane, the diepoxides of allyl cyclopentenyl ether, 1,4-cyclohexadiene diepoxide, 3,4-epoxycyclohexylmethyl 3,4-epoxycyclohexane carboxylate, and bis(3,4-epoxycyclohexylmethyl)adipate, of which bis-(2,3-epoxycyclopentyl)ether and 3,4-epoxycyclohexylmethyl 3,4-epoxycyclohexane carboxylate are particularly preferred. Where desired, up to about 40%, and preferably up to about 30% by weight, of a coepoxide may be substituted for the cycloaliphatic epoxide, based on the combined weight of the cycloaliphatic epoxide and the coepoxide. Preferred coepoxides for this purpose include the bisphenol A epoxy resins of formula II, where n is between 0 and 15, epoxidized novolak resins of formulae III and IV wherein n is between 0.1 to 8, and N,N,N',N'-tetraglycidyl 4,4'-diaminodiphenyl methane.

Other preferred resin formulations will typically contain a diglycidyl ether of bisphenol A, N,N,N',N'-tetraglycidylxylylene diamine, O,N,N-triglycidyl-3-aminophenol, O,N,N-triglycidyl-4-aminophenol, glycidyl glycidate, N,N-diglycidyl aniline and N,N-diglycidyl toluidine as the resin component.

The aromatic diamine hardeners useful in the compositions of this invention include any of the aromatic diamine hardeners conventionally used to cure epoxy resins. Examples of such hardeners include 4,4'- diaminodiphenyl ether, 3,3'-diaminodiphenyl sulfone, p-phenylenediamine, 4,4'-diaminodiphenyl propane, 4,4'-diaminodiphenylsulfide, 1,4-bis(p-aminophenoxy)-benzene, 1,4-bis(m-aminophenoxy)benzene, 3,3'-diaminodiphenyl methane, m-phenylenediamine, 1,3-bis-(m-aminophenoxy)benzene, eutectic mixtures of m-phenylenediamine and 4,4'-diaminodiphenyl methane, 4,4'-diaminodiphenyl methane, 3,4'-diaminodiphenyl ether, bis(4-aminocyclohexyl)methane, 4,4'-(3-phenylenediisopropylidene)bisaniline, 4,4'-(4-phenylenediisopropylidene)bisaniline, 4,4'-(3-phenylenediisopropylidene)bis-(3-toluidene), 4,4'-bis(3-aminophenoxy)-diphenyl sulfone, 2,2-bis[4-(4-aminophenoxy)phenyl]propane, trimethylene glycol di-p-aminobenzoate, 4,4'-diaminodiphenyl sulfone, 4,4'-bis(4-aminophenoxy)diphenyl sulfone, 4,4'-bis(4-aminophenoxy)-3,3',5,5'-tetramethyl diphenyl sulfone, 4,4'-bis(4-amino-3-methylphenoxy)diphenylsulfone, the ring alkylated derivatives of m-phenylenediamine, adducts of epoxy resins with the foregoing diamines, such as the adduct formed by reacting one mole of a liquid bisphenol A epoxy resin with 2 to 4 moles of m-phenylenediamine by itself or in combination with 4,4'-diaminodiphenyl methane, adducts of bisphenol A epoxy resin with a molar excess of 4,4'-diaminodiphenyl sulfone, and the various aromatic diamines described in commonly assigned copending application Ser. Nos. 534,649, filed Sept. 22, 1983 and 564,393, filed Dec. 22, 1983, now U.S. Pat. No. 4,567,216 and U.S. Pat. No. 4,517,321, the entirety of which are hereby incorporated by reference and relied upon in their entirety.

Preferred diamines for use in this invention include m-phenylenediamine, the ring alkylated derivatives thereof, adducts of epoxy resins and m-phenylenediamine, eutectic mixtures of m-phenylenediamine and 4,4'-diaminodiphenyl methane, 4,4'-bis(3-aminophenoxy)diphenyl sulfone, 2,2'-bis[4-(4-aminophenoxy)phenyl]propane, and trimethyleneglycol di-para-aminobenzoate.

The compositions of this invention may optionally contain a thermoplastic polymer. These materials have beneficial effects on the viscosity and film strength characteristics of the epoxy/hardener/accelerator mixture.

The thermoplastic polymers used in this invention include polyarylethers of formula VII which are described in U.S. Pat. Nos. 4,108,837 and 4,175,175,

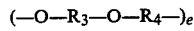   VII wherein $R_3$ is a residuum of a dihydric phenol such as bisphenol A, hydroquinone, resorcinol, 4,4-biphenol, 4,4'-dihydroxydiphenyl sulfone, 4,4'-dihydroxy-3,3',5,5'-tetramethyldiphenyl sulfide, 4,4'-dihydroxy-3,3',5,5'-tetramethyldiphenyl sulfone and the like. $R_4$ is a residuum of a benzenoid compound susceptible to nucleophilic aromatic substitution reactions such as 4,4'-dichlorodiphenyl sulfone, 4,4'-difluorobenzophenone, and the like. The average value of e is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of formula VIII.

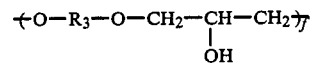   VIII where $R_3$ has the same meaning as for Formula VII and the average value of f is between about 8 and about 300; and polycarbonates such as those based on bisphenol A, tetramethyl bisphenol A, 4,4'-dihydroxydiphenyl sulfone, 4,4'-dihydroxy-3,3',5,5'-tetramethyldiphenyl sulfone, hydroquinone, resorcinol, 4,4'-dihydroxy-3,3',5,5'-tetramethyldiphenyl sulfide, 4,4'-biphenol, 4,4'-dihydroxydiphenyl sulfide, phenolphthalein, 2,2,4,4-tetramethyl-1,3-cyclobutane diol, and the like. Other suitable thermoplastics include poly (ε-caprolactone); polybutadiene; polybutadiene/acrylonitrile copolymers, including those optionally containing amine, carboxyl, hydroxyl, or —SH groups; polyesters, such as poly(butylene terephthalate); poly(ethylene terephthalate); polyetherimides such as the Ultem resins (obtained from the General Electric Company); acrylonitrile/-butadiene/styrene terpolymers, polyamides such as nylon 6, nylon 6,6, nylon 6,12, and Trogamid T (obtained from Dynamit Nobel Corporation); poly(amide imides) such as Torlon poly(amide imide) (obtained from Amoco Chemical Corporation, Napierville, IL); polyolefins; polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like. The preferred thermoplastic polymers for use in this invention include the polyhydroxyethers, polyetherimides and the polyarylethers.

The compositions of this invention may include a structural fiber. The structural fibers which are useful in this invention include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1,000 to 400,000 filaments each), woven cloth, whiskers, chopped fiber or random mat. The preferred fibers are carbon fibers, aromatic polyamide fibers, such as Kevlar 49 fiber (obtained from E. I. duPont de Nemours, Inc., Wilmington, DE), and silicon carbide fibers.

The compositions of this invention may also include modifiers which increase the modulus of cured epoxy resins. Examples of such modifiers include antiplasticizers such as dibutylphthalate, phenol adducts of bisphenol A epoxy resins, polyhalogenated biphenyls, azobenzene, hydroxy diphenyl, tricresyl phosphate; fortifiers such as the various reaction products between a substituted aromatic amine or amide and a monoepoxide or diepoxide described by P. D. McLean et al in *The British Polymer Journal*, Volume 15, March 1983, pages 66–70, which is hereby incorporated by reference and relied on in its entirety; as well as such other modifiers as are known to those skilled in the art.

Preferred modifiers for use in the compositions of this invention comprise the fortifiers described in U.S. Pat. No. 4,480,082. These fortifiers comprise the reaction product of (i) an aromatic amide having the amine group of the amide attached to an aromatic ring, and (ii)

a mono- or di-epoxide. A particularly preferred fortifier of this type comprises the reaction product of phenyl glycidyl ether and 4-hydroxyacetanilide. This material is available commercially from Uniroyal Canada (Guelph, Ontario, Canada) as "Fortifier I", and contains approximately 80 to 98 percent by weight of adducts of 4-hydroxyacetanilide and phenyl glycidyl ether (1:4.3 molar ratio), 0 to 12 percent unreacted phenyl glycidyl ether and 0 to 8 percent unreacted 4-hydroxyacetanilide. The epoxy equivalent weight of Fortifier I is greater than or equal to 900 g/mole.

Also preferred is "Fortifier C", also available from Uniroyal Canada, which comprises the reaction product of aniline and vinylcyclohexene dioxide.

In the compositions of this invention, the aromatic diamine hardener is employed in an amount sufficient to provide from about 0.4 to 2.0, preferably from about 0.6 to 1.9, and most preferably from 0.7 to 1.7 equivalents of amine N—H per equivalent of epoxy group in the epoxy resin. The cure accelerator is generally used in an amount sufficient to provide from 0.01 to 0.35, preferably 0.03 to 0.3, and most preferably 0.04 to 0.25 equivalents of hydroxy groups per equivalent of epoxy groups in the resin. Typical formulations within these ranges will comprise from about 30 to 90 and preferably from 40 to 80 percent by weight of the epoxy resin; from about 10 to 70 and preferably from 15 to 65 percent by weight of the hardener; and from 0.1 to 10, preferably from 0.5 to 7, and most preferably from about 1 to 6 percent by weight of the cure accelerator. When a thermoplastic polymer is to be included in the composition, the amount thereof comprises up to about 20%, and preferably less than 15 percent by weight. The modifier, when employed, comprises up to about 35, and preferably less than 30 percent by weight. For the purpose of the foregoing, all weights are calculated based on the combined weight of resin, hardener, cure accelerator, modifier (when present) and thermoplastic polymer (when present), which are collectively referred to herein as the "resinous portion of the composite".

Where structural fiber is included in the composition, the amount thereof ranges from up to 85, generally from 20 to 80, and preferably from 30 to 80 percent by weight of the total composition, i.e., the combined weight of structural fiber plus the resinous portion of the composite.

A particularly preferred formulation for use in the preparation of composite materials comprises, as the resinous portion of the composite, bis(2,3-epoxycyclopentyl)ether; from 5 to 40 percent by weight of Fortifier I modifier; phloroglucinol, pyrogallol and/or n-propyl gallate in an amount sufficient to provide 0.03 to 0.3 equivalents of hydroxy group per equivalent of epoxy group; and m-phenylene diamine in an amount sufficient to provide from 0.6 to 1.9 equivalents of amine N—H group per equivalent of epoxy group.

The compositions of this invention can be prepared by combining the cure accelerator with either the epoxy or the amine to make a pre-mix, which is thereafter mixed with the remaining components to complete the composition.

Composite materials may be prepared by any of the procedures known to those skilled in the art, such as by wet winding or hot melt. In wet winding, a continuous tow of reinforcement is passed through a resin bath containing a mixture of the epoxide, the amine hardener, accelerator and optionally, the modifier and thermoplastic polymer. After the tow is impregnated with the resin, it is passed through squeeze rolls to remove excess resin. Preferably, because of the fast curing characteristics of these compositions, the preimpregnated reinforcement is used to make a composite article soon after it is prepared.

Composites may be prepared by curing preimpregnated reinforcement using heat and optionally pressure. Vacuum bag/autoclave cures work well with these compositions. Laminates may also be prepared via wet lay-up followed by compression molding, resin transfer molding, or by resin injection, as described in European Patent Application 0019149 published Nov. 26, 1980. Typical cure temperatures are from 100° F. to about 500° F., preferably from about 180° F. to about 450° F. Cure times depend on the fabrication process and may be as long as several hours or as short as from about 1 to about 2 minutes depending on the composition utilized.

The compositions of this invention are well suited for filament winding. In this composite fabrication process, continuous reinforcement in the form of tape or tow— either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight of the structural fibers in the composition may be replaced by filler. Thixotropic agents such as fumed silica may also be used.

Further, the compositions may be used as adhesives, potting and encapsulation compounds, and in coating applications.

EXAMPLES

The following examples serve to give specific illustration of the practice of this invention but they are not intended in any way to limit the scope of this invention.

In the Examples which follow, the epoxy equivalent weight (EEW) is defined as the grams of epoxy resin per mole of 1,2 epoxide group.

EXAMPLES 1 and 2 and Controls A and B

Examples 1 and 2 and Controls A and B describe viscosity versus time data for bis(2,3-epoxycyclopentyl)ether/meta-phenylenediamine (MPDA) mixtures alone and with phloroglucinol (Ishihara Corporation, San Francisco, CA), n-propylgallate (Aldrich Chemicals, Milwaukee, WI) and bisphenol-S (Aldrich Chemicals) as cure accelerators.

The procedures employed in these experiments were as follows:

A 250 ml, three-necked flask equipped with a paddle stirrer, thermometer with a Thermo-O-Watch controller, an inlet and outlet for nitrogen, and an electric heating mantle was charged with 100 g of bis(2,3-epoxycyclopentyl)ether and 5 g of acclerator. The mixture was heated and stirred at 120° C. for 115 minutes. During this period, the accelerator dissolved. After the solution was cooled to 65° C., m-phenylenediamine, 47 g, was charged to the flask. The mixture was thereafter stirred for 12 minutes until the amine hardener dissolved. In the case of Control B, 100 g of bis(2,3-epoxycyclopentyl)ether was mixed with 47 g of MPDA at 65° C. In all cases, 15-20 g of solution was charged to a sample cup of a Brookfield thermosel viscometer. Viscosity vs. time measurements were then made at 66° C. The results of these experiments are shown in Table I.

These results demonstrate that phloroglucinol and n-propyl gallate are significantly more active accelerators than the dihydroxy aromatic compound bisphenol S.

TABLE I

VISCOSITY[c] VS. TIME OF BIS(2,3-EPOXYCYCLO-PENTYL) ETHER/MPDA MIXTURES AT 66° C.

| | Accelerator[a] | Time[b] | | | |
|---|---|---|---|---|---|
| | | 30 min | 45 min | 60 min | 75 min |
| Example 1 | Phloroglucinol | 135 | 440 | 1,770 | 12,000 |
| Example 2 | n-Propyl gallate | 88 | 270 | 1,300 | 10,000 |
| Control A | Bisphenol-S | 35 | 64 | 117 | 280 |
| Control B | None | 13 | 18 | 22 | 22 |

[a]Concentration of all accelerators: 5 phr.
[b]After addition of MPDA.
[c]Viscosity measured in centipoises. EEW of bis(2,3-epoxycyclopentyl) ether = 92 g/mole.

EXAMPLE 3

A 30 g portion of a solution of phloroglucinol in bis(2,3-epoxycyclopentyl)ether as described in Example 1 and was maintained at a temperature of 60° C. for 45 days. The viscosity of the final solution at room temperature was similar to that of the initial mixture. The EEW of the bis(2,3-epoxycyclopentyl)ether resin/p-hloroglucinol mixture, moreover, did not change after 45 days. These results illustrate the excellent storage stability of the epoxy resin/cure accelerator mixtures of this invention in the absence of amine curing agents.

Examples 4 through 9 and Controls C through E describe the preparation and properties of unreinforced cure castings. Casting dimensions were 1/8×8×4 to 8 inches. Typical weights for these castings ranged from 80 to 160 g.

The castings prepared in these experiments were tested to determine tensile properties and heat deflection temperature. Tensile properties were measured according to ASTM D-638 using a Type I dogbone specimen. Heat deflection temperatures were measured according to ASTM D-648 (264 psi stress).

EXAMPLE 4

A 250 ml, round-bottomed flask equipped with a paddle stirrer, thermometer with a Therm-O-Watch controller, an inlet and outlet for inert gas, and an electric heating mantle was charged with 100 g of bis(2,3-epoxycyclopentyl)ether and 5.0 g of phloroglucinol.

The mixture was heated and stirred at 110° C. for 115 minutes. During this period, the phloroglucinol dissolved. After the bis(2,3-epoxycyclopentyl)ether/p-hloroglucinol solution had cooled to 60° C., m-phenylene diamine, 47 g, was charged to the flask. The resulting mixture was stirred for 12 minutes at 60° C. until the diamine dissolved. This solution was then poured into a mold preheated to 100° C. The mold was placed into an oven and heated for four hours at 85° C. The temperature of the oven was then raised from 85° C. to 179° C. over a 100 minute period, followed by 2 hours at 179° C. After the mold was cooled to room temperature, a hard, clear, solid casting was removed. The properties of the casting are shown in Table II.

EXAMPLE 5

The procedure described in Example 4 was repeated except that 5.0 g of n-propyl gallate was substituted for the phloroglucinol. The properties of the resulting casting are shown in Table II.

EXAMPLE 6

The procedure described in Example 4 was again repeated except that 5.0 g of pyrogallol was substituted for phloroglucinol. The properties of the resulting castings are shown in Table II.

Control C

The procedure described in Example 4 was repeated except bisphenol-S was substituted for phloroglucinol.

Control D

The procedure described in Example 4 was repeated except that an accelerator was not used for preparing this casting.

As can be seen from Table II, the castings containing phloroglucinol and n-propyl gallate showed higher strength and modulus than that of the controls without an accelerator or with bisphenol S. At a 5 phr (based on 100 parts of epoxy resin) loading of phloroglucinol, the tensile strength increased from 18,500 psi to 20,100 psi (from about 127 MPa to 139 MPa) and the modulus increased from 668×10³ psi to 796×10³ psi (4,600 MPa to 5490 MPa). Heat distortion temperature, while was slightly lower than that of the casting prepared without an accelerator (157° C. vs. 166° C.) was nevertheless still good and was similar to that of the bisphenol S based coating. Phloroglucinol and n-propyl gallate thus function not only as accelerators for epoxy/amine systems but also as modulus and strength modifiers for such systems as well.

Control E

A homogeneous solution was prepared by combining 100 g of bis(2,3-epoxycyclopentyl)ether with 20 g of Fortifier I at 100° C. for 30 minutes. This solution was blended with 47 g of MPDA at 60° C. The mixture was stirred, degassed, poured into a mold, and cured as described in Table II.

EXAMPLE 7

A solution containing 100 g of bis(2,3-epoxycyclopentyl)ether and 5.0 g of phloroglucinol was prepared as described in Example 1. This solution was blended with 20 g of Fortifier I and then mixed with 47 g of MPDA at 60° C.; the homogeneous mixture was degassed and poured into a mold, and cured as described in Table II. The tensile properties and heat deflection temperature are given in Table II.

As can be seen from Table II, this composition affords outstanding mechanical properties. The tensile strength increased from 18,500 psi to 23,300 psi (127 MPa to 161 MPa) and modulus increased from 668×10³ psi to 860×10³ psi (4,600 MPa to 5930 MPa). This system also affords higher reactivity than Controls C and D.

EXAMPLE 8

A solution containing 100 g of bis(2,3-epoxycyclopentyl)ether and 3.0 g of phloroglucinol was prepared as described in Example 1. This solution was blended with 12.5 g of Fortifier I and then mixed with 47 g of MPDA at 60° C. The homogeneous mixture was degassed and poured into a mold, and cured as described in Table II.

EXAMPLE 9

The procedure described in Example 6 was repeated except that 5.0 g of pyrogallol was substituted for the phloroglucinol. The properties of the casting are shown in Table II.

Examples 7 to 9 and Control E illustrate the effect of phloroglucinol and pyrogallol on compositions containing a modifier. As can be seen from Table II, the addition of phloroglucinol and pyrogallol further improves the tensile modulus of the composition over that obtained by the addition of Fortifier I, producing castings having exceptionally high modulus.

mixture was stirred, degassed, poured into a mold, and cured as described in Table III.

Controls F and G

The procedure described in Example 10 was repeated for Control F except that bisphenol S was substituted for phloroglucinol. Control G was similarly prepared but without an accelerator.

TABLE III

| UNREINFORCED CASTING PROPERTIES[a] | | | |
|---|---|---|---|
|  | Example 10 | Control F | Control G |
| RESIN FORMULATION | | | |
| 3,4-epoxycyclohexylmethyl 3,4-epoxycyclohexane carboxylate (g) | 100 | 100 | 100 |
| MPDA (g) | 24 | 24 | 24 |
| Phloroglucinol (g) | 5 | — | — |
| Bisphenol-S (g) | — | 5 | — |
| CASTING PROPERTIES | | | |
| Tensile strength ($10^3$ psi) | 14.4 | 10.7 | TOO BRITTLE |
| Tensile modulus ($10^3$ psi) | 663 | 618 | TO TEST |
| Elongation (%) | 2.9 | 2.0 | |

TABLE II

| UNREINFORCED CASTING PROPERTIES | | | | | | | | | |
|---|---|---|---|---|---|---|---|---|---|
| Resin Formulation | Example 4[a] | Example 5[a] | Example 6[a] | Control C[a] | Control D[a] | Control E[b] | Example 7[b] | Example 8[b] | Example 9[b] |
| Bis(2,3-epoxycyclopentyl)ether (g) | 100 | 100 | 100 | 100 | 100 | 100 | 100 | 100 | 100 |
| MPDA (g) | 47 | 47 | 47 | 47 | 47 | 47 | 47 | 47 | 47 |
| Phloroglucinol (g) | 5 | — | — | — | — | — | 5 | 3 | — |
| Pyrogallol (g) | — | — | 5 | — | — | — | — | — | 5 |
| Bisphenol S (g) | — | — | — | 5 | — | — | — | — | — |
| n-propyl Gallate (g) | — | 5 | — | — | — | — | — | — | — |
| Fortifier 1 (g) | — | — | — | — | — | 20 | 20 | 12.5 | 20 |
| CASTING PROPERTIES | | | | | | | | | |
| Tensile Strength ($10^3$ psi) | 20.1 | 19.5 | — | 19.2 | 19.2 | 21.9 | 23.3 | 21.9 | 22.1 |
| Tensile Modulus ($10^3$ psi) | 796 | 731 | 748 | 690 | 668 | 762 | 860 | 831 | 838 |
| Elongation (%) | 5.7 | 5.3 | — | 6.7 | 8.7 | 5.6 | 4.3 | 4.0 | 3.5 |
| Heat Deflection Temperature (°C.) | 157 | 157 | 157 | 162 | 166 | 128 | 126 | 139 | 122 |

Cure Schedule:
[a] 4 hours at 85° C.
1° C./min 85° C. to 179° C.
2 hours at 179° C.
[b] 2 hours at 65° C.
0.5° C./min. 65° C. to 85° C.
4 hours at 85° C.
1°/C. min. 85° C. to 179° C.
2 hours at 179° C.

Examples 10 through 12 and Controls F, G, H and K describe unreinforced castings prepared from various other epoxy/aromatic amine resin systems. Resin formulations, casting properties, and cure schedules are shown in Tables III and IV.

The data in Tables III and IV demonstrate that the cure accelerator of this invention may be used with a wide variety of epoxides and aromatic amines to enhance modulus, strength and in some cases heat deflection temperature.

EXAMPLE 10

A 250 ml flask equipped as described in Example 1 was charged with 100 g of 3,4-epoxycyclohexylmethyl 3,4-epoxycyclohexane carboxylate (Union Carbide ERL-4221, EEW ~137) and 5.0 g of phloroglucinol. The mixture was heated with stirring at 110° C. for 80 minutes to dissolve the phloroglucinol. After the solution was cooled to 65° C., MPDA, 28 g, was added. The

| Heat Deflection Temperature (°C.) | 153 | 147 |
|---|---|---|

[a] Cure Schedule:
2 hr. at 85° C.
1° C./min at 85° C. to 130° C.
1 hr at 130° C.
1° C./min 130° C. to 179° C.
2 hr. at 179° C.

EXAMPLE 11

A solution containing 100 g of bis(2,3-epoxycyclopentyl)ether and 8.0 g of phloroglucinol was prepared as described in Example 1. This solution was blended with 114 g of trimethyleneglycol-di-paraaminobenzoate at 119° C. The resulting homogeneous mixture was then degassed and poured into a mold, and cured as described in Table IV.

Control H

The procedure described in Example 11 was repeated except that an accelerator was not used for preparing this casting.

Control K

A homogeneous solution was prepared by combining 100 g of diglycidyl ether of bisphenol A epoxy resin (EEW~180) with 52 g of trimethyleneglycol-di-para-aminobenzoate at 110° C. This solution was degassed and then poured into a mold and cured as described in Table IV.

EXAMPLE 12

A solution containing 100 g of diglycidyl ether of bisphenol A epoxy resin (EEW~180) with 5.0 g of phloroglucinol was prepared as described in Example 1. The solution was blended with 52 g of trimethyleneglycol-di-para-aminobenzoate. An unreinforced casting was thereafter prepared from this mixture as described in Control K.

It is evident from Table IV that the casting prepared in Example 12 possesses higher modulus and higher heat distortion temperature than the equivalent casting not containing phloroglucinol (i.e., Control K).

TABLE IV
UNREINFORCED CASTING PROPERTIES

|  | Example 11[a] | Control H[a] | Control K[b] | Example 12[b] |
|---|---|---|---|---|
| RESIN FORMULATION | | | | |
| Bis(2,3-epoxycyclopentyl) ether (g) | 100 | 100 | — | — |
| Diglycidylether of Bisphenol-A (g) | — | — | 100 | 100 |
| Trimethyleneglycol-di-para-amino-benzoate | 114 | 114 | 52 | 52 |
| Phloroglucinol (g) | 8 | — | — | 5 |
| CASTING PROPERTIES | | | | |
| Tensile strength ($10^3$ psi) | 11.9 | TOO BRITTLE TO TEST | 11.5 | — |
| Tensile modulus ($10^3$ psi) | 560 | | 322 | 380 |
| Elongation (%) | 2.4 | | 10.7 | — |
| HDT (°C.) | 117 | | 121 | 138 |

Cure Schedule:
[a] 4 hr. at 60° C.
1° C./min at 60° C. to 85° C.
4 hr at 85° C.
1° C./min 85° C. to 179° C.
4 hr. at 179° C.
[b] 4 hr. at 100° C.
1° C./min. 100° C. to 179° C.
2 hr. at 179° C.

Examples 13 and 14 describe the preparation of unidirectional carbon fiber composites using the compositions of this invention. Each of the described composites were made using a polyacrylonitrile-based carbon fiber with a tensile strength of $7.8 \times 10^5$ psi and a tensile modulus of $41 \times 10^6$ psi.

EXAMPLE 13

A carbon fiber tow containing 12,000 filaments was drawn through a resin bath containing the resin formulation described in Example 8. The impregnated fiber was wound on a 8 inch square frame to a thickness of approximately ⅛ inch. The impregnated fiber in the frame contained approximately 30 percent by weight of resin. The resin was cured by placing the frame in an oven and heating according to a programmed cure cycle which comprised 4 hours at 85° C., 85° C. to 120° C. at 1° C./minute, hold 2 hours at 120° C., 120° C. to 179° C. at 1° C./minute, hold 2 hours at 179° C. The frame was thereafter removed from the oven, following which the cured carbon fiber composite was removed therefrom and tested for transverse strength and modulus according to ASTM D-3039. The transverse tensile modulus of this composite was found to be 1.78 million psi. The fiber volume fraction was 70.2 percent.

EXAMPLE 14

The impregnated fiber prepared as in Example 13 was wound onto a steel mandrel with a diameter of 5¾ inches. Four plies of fiber were laid down in a band approximately four inches long. The fiber areal weight was approximately 206 gm/sq. meter. The mandrel and impregnated fiber were cured using the schedule in Example 13. After the resin cured, the cylindrical cured composite was removed from the mandrel and sectioned into half inch wide rings for hoop tensile testing according to ASTM D-2290. The fiber volume fraction was 68.3 percent. The average hoop tensile strength of five rings was 489,000 psi. This result indicates that the compositions of this invention may be advantageously used in the preparation of high strength composites made via filament winding.

What is claimed is:

1. A curable, thermosetting epoxy composition comprising:
   (a) an epoxy resin containing at least two 1,2-epoxy groups per molecule;
   (b) an aromatic diamine hardener in an amount sufficient to provide from about 0.4 to about 2.0 equivalents of amine N—H per equivalent of 1,2-epoxy group in the epoxy resin; and
   (c) an aromatic trihydroxy cure accelerator of the formula:

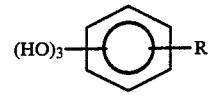

wherein R is hydrogen, aryl, alkyl,

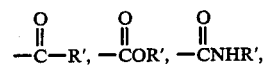

$SO_2R'$, or $SO_2NHR'$, and R' is alkyl or aryl of from 1 to 12 carbon atoms, in an amount sufficient to provide from about 0.01 to about 0.35 equivalents of hydroxy per equivalent of 1,2-epoxy groups in the epoxy resin.

2. The composition of claim 1, wherein the cure accelerator is phloroglucinol, n-propyl gallate, pyrogallol or mixtures thereof.

3. The composition claim 2, wherein the cure accelerator is phloroglucinol.

4. The composition of claim 2, wherein the cure accelerator is n-propyl gallate.

5. The composition of claim 2, wherein the cure accelerator is pyrogallol.

6. The composition of claim 2, wherein the epoxy resin is a cycloaliphatic epoxide.

7. The composition of claim 6, wherein the aromatic diamine hardener is m-phenylenediamine, a eutectic mixture of m-phenylenediamine and 4,4'-diaminodiphenyl methane, 4,4'-diaminediphenyl methane, 4,4'-bis(3- aminophenoxy)-diphenyl sulfone, 2,2-bis[4-(4-aminophenoxy)phenyl]propane, trimethylene glycol di-para-aminobenzoate, 4,4-diaminodiphenyl sulfone, 4,4'-bis(4-aminophenoxy)diphenyl sulfone, adducts of epoxy resins with m-phenylenediamine, 4,4'-bis(4-aminophenoxy)-3,3',5,5'-tetramethyl diphenyl sulfone, 4,4'-bis(4-amino-3-methylphenoxy)diphenyl sulfone, the ring alkylated derivatives of m-phenylenediamine or mixtures thereof.

8. The composition of claim 6, wherein the aromatic diamine hardener is m-phenylenediamine, the ring alkylated derivatives thereof, adducts of epoxy resins and m-phenylenediamine, eutectic mixtures of m-phenylenediamine and 4,4'-diaminodiphenyl methane, or mixtures thereof.

9. The composition of claim 6, wherein the cycloaliphatic epoxide is bis(2,3-epoxycyclopentyl)ether.

10. The composition of claim 6, wherein the cycloaliphatic epoxide is vinylcyclohexene diepoxide, 2-(3,4-epoxycyclohexyl-5,5-spiro-3,4-epoxy)cyclohexane meta-dioxane, 3,4-epoxycyclohexyl-methyl 3,4-epoxycyclohexane carboxylate, 3,4-epoxy-6-methylcyclohexylmethyl 3,4-epoxy-6-methylcyclohexane carboxylate, dipentene dioxide, epoxidized polybutadiene, bis(3,4-epoxy cyclohexylmethyl)adipate or mixtures thereof.

11. The composition of claim 6 wherein the cycloaliphatic epoxide is selected from one or more of:

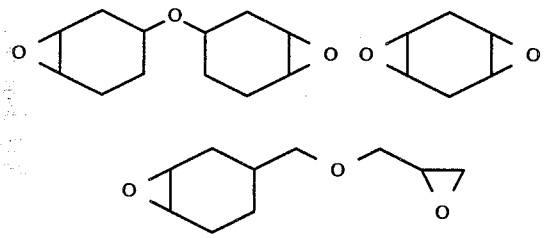

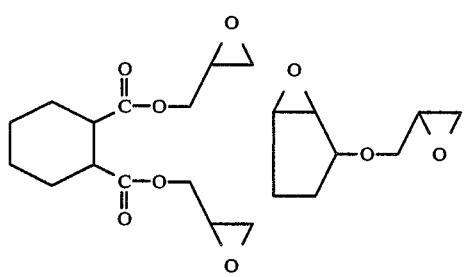

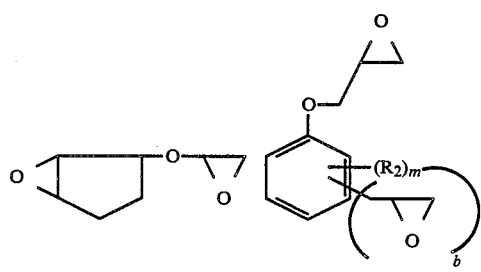

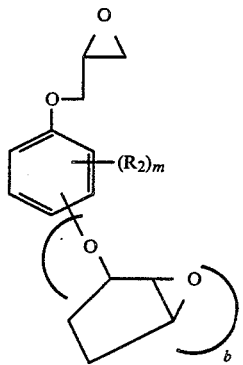

where b is 1 to 4, m is (5-b), and $R_2$ is H, halogen, or $C_1$ to $C_4$ alkyl.

12. The composition of claim 6, further comprising up to 40 percent by weight of a coepoxy resin.

13. The composition of claim 12, wherein the coepoxy is selected from one or more of the following:

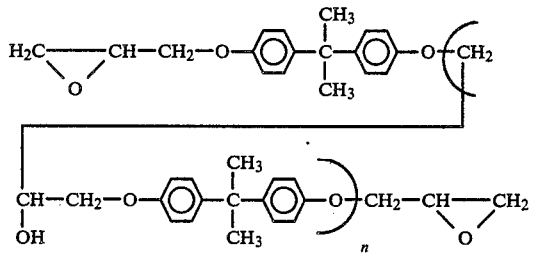

wherein n is from 0 to about 15;

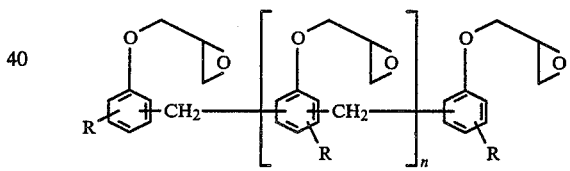

wherein n is from 0.1 to about 8 and R is hydrogen; and

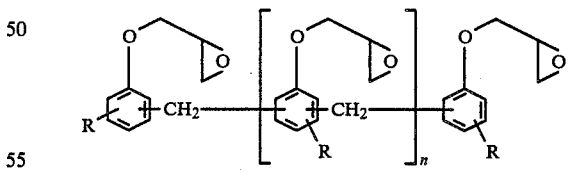

wherein n is from 0.1 to about 8 and R is $CH_3$.

14. The composition of claim 6, further comprising up to about 20% by weight of a thermoplastic polymer.

15. The composition of claim 14, wherein said thermoplastic polymer is a polyhdroxyether, a polyetherimide, a polyarylether, a polysulfone, a polycarbonate or mixtures thereof.

16. The composition of claim 6, further comprising up to 35% by weight of a modifier which increases the modulus of the epoxy resin.

17. The composition of claims 1, 2, 6, 14 or 16, further comprising a structural fiber having a tensile strength of greater than about 100,000 psi, a tensile modulus of greater than about two million psi, and a decomposition temperature of greater than about 200° C.

18. The composition of claim 17, wherein said structural fiber is selected from the group consisting of from carbon, graphite, glass, silicon carbide, poly(benzothiazole), poly(benzimidazole), poly(benzoxazole), alumina, titania, boron, aromatic polyamides, and mixtures thereof.

19. The composition of claim 17 in the form of a composite.

20. A composite material comprising:
(a) a cycloaliphatic epoxide resin containing at least two 1,2-epoxy groups per molecule;
(b) an aromatic diamine hardener in an amount sufficient to provide from about 0.4 to 2.0 equivalents of amine N—H per equivalent of 1,2-epoxy groups in the epoxide resin;
(c) an aromatic trihydroxy cure accelerator selected from the group consisting of phloroglucinol, n-propyl gallate, pyrogallol and mixtures thereof in an amount sufficient to provide from about 0.01 to about 0.35 equivalents of hydroxy per equivalent of 1,2-epoxy in the epoxide resin; and
(d) up to about 85% by weight, based on the total weight of the composition, of a structural fiber having a tensile strength of greater than about 100,000 psi, a tensile modulus of greater than about two million psi, and a decomposition temperature of greater than about 200° C.

21. The composite of claim 20, wherein the cycloaliphatic epoxide is bis(2,3-epoxycyclopentyl)ether.

22. The composite of claim 20, wherein the cycloaliphatic epoxide is vinylcyclohexene diepoxide, 2-(3,4-epoxycyclohexyl-5,5-spiro-3,4-epoxy)cyclohexane meta-dioxane, 3,4-epoxycyclohexylmethyl 3,4-epoxycyclohexane carboxylate, 3,4-epoxy-6-methylcyclohexylmethyl 3,4-epoxy-6-methylcyclohexane carboxylate, dipentene dioxide, epoxidized polybutadiene, bis(3,4-epoxy cyclohexylmethyl)adipate or mixtures thereof.

23. The composite of claim 20, wherein the cycloaliphatic epoxide is selected from one or more of:

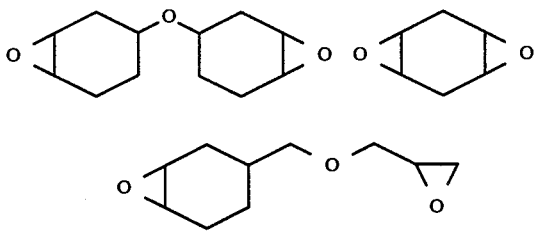

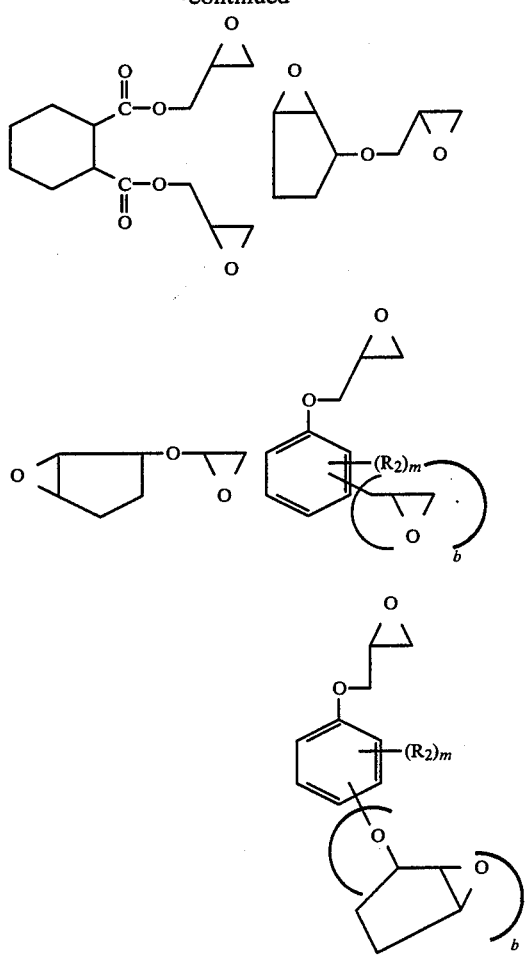

where b is 1 to 4, m is (5-b), and $R_2$ is H, halogen, or $C_1$ to $C_4$ alkyl.

24. The composite of claims 21, 22 or 23, wherein the aromatic diamine hardener is m-phenylenediamine, the ring alkylated derivatives thereof, adducts of epoxy resins and m-phenylenediamine, eutectic mixtures of m-phenylenediamine and 4,4'-diaminodiphenyl methane, or mixtures thereof.

25. The composite of claim 24, further comprising up to about 40 percent by weight of a coepoxy resin, based on the combined weight of the cycloaliphatic epoxide resin and the coepoxy resin.

26. The composite of claim 24, further comprising up to about 35% by weight, based upon the total weight of the resinous portion of the composite, of a modifier which increases the modulus of the epoxy resin.

27. The composite of claim 24, further comprising up to about 20% by weight, based upon the total weight of the resinous portion of the composite, of a thermoplastic polymer.

* * * * *